C. T. WESTLIN.
ENDLESS CONVEYER BELT.
APPLICATION FILED MAR. 12, 1914.
1,203,827.
Patented Nov. 7, 1916.
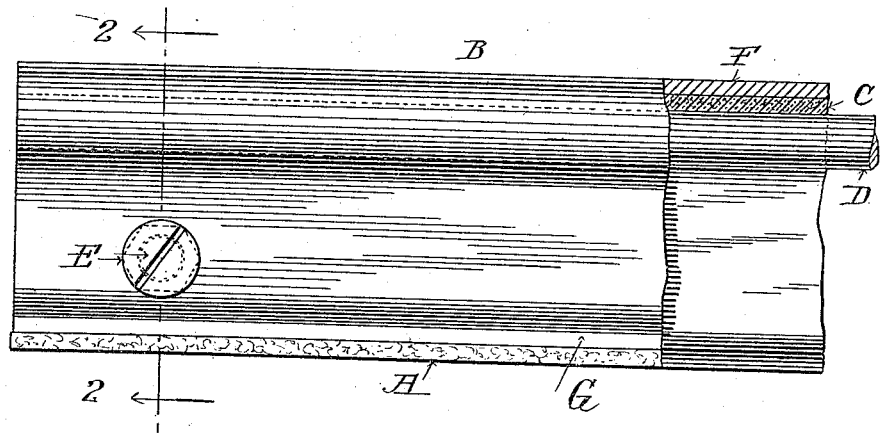
Fig. 1.
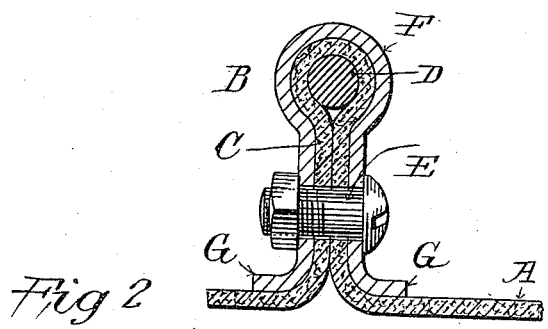
Fig. 2
Fig. 3.
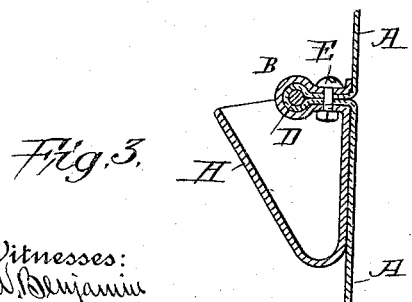
Fig. 4.
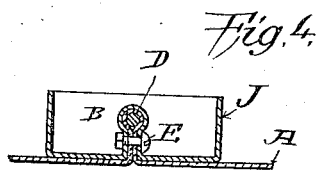
Witnesses:
C. W. Benjamin
W. A. Darby
Carl T. Westlin, Inventor
By his Attorney
Samuel E. Darby

UNITED STATES PATENT OFFICE.

CARL T. WESTLIN, OF ARLINGTON, NEW JERSEY.

ENDLESS CONVEYER-BELT.

1,203,827.  Specification of Letters Patent.  Patented Nov. 7, 1916.

Application filed March 12, 1914. Serial No. 824,138.

*To all whom it may concern:*

Be it known that I, CARL T. WESTLIN, a subject of the King of Sweden, and resident of Arlington, county of Hudson, State of New Jersey, have made a certain new and useful Invention in Endless Conveyer-Belts, of which the following is a specification.

This invention relates to endless conveyer belts.

The object of the invention is to provide an endless conveyer belt of novel construction, which is efficient and economical to manufacture.

A further object is to provide an endless conveyer belt wherein carrying portions are provided therein without the use of rivets or other securing devices which come in wearing contact with the guide surface on or in connection with which the belt operates.

Other objects of the invention will appear more fully hereinafter.

The invention consists substantially in the construction, combination, location, and relative arrangement of parts, all as will be more fully hereinafter set forth, as shown in the accompanying drawing and finally pointed out in the appended claim.

In the drawing,—

Figure 1 is a view in transverse section of a conveyer belt constructed in accordance with the principles of my invention, parts being broken out and parts in elevation. Fig. 2 is a broken detail view in section taken longitudinally of the belt through a transverse carrier portion on the line 2, 2, Fig. 1. Figs. 3 and 4, are broken detail sectional views similar to Fig. 2, showing various modes of application of an endless conveyer belt embodying my invention.

In the use of endless conveyer belts it is usual to provide the belt with carrying portions, cleats or the like to engage and carry the material to be handled, or to which buckets or other form of receptacles are connected. A common practice is to rivet transverse cleats to the surface of the belt, said cleats serving to engage and carry the material to be handled, or to rivet carrying clips for the buckets or other receptacles to the conveyer body. The objection to this method is that the rivets employed to secure the cleats or clips to the belt pass through the body of the belt and hence come in contact with the surface which forms a guide for the belt, thereby causing wear on such surface. Moreover the rivets are liable to pull out on account of the strains imposed thereon, thereby injuring, if not destroying the belt.

It is among the special purposes of my present invention to avoid these objections, and to provide an efficient construction of conveyer belt wherein the carrying portion is formed in a peculiarly efficient, strong and durable manner, and in which the rivets employed do not come in contact with the belt guide surface and is not subjected to strains tending to tear them out of the body of the belt.

In the drawing, A designates the body of an endless belt or conveyer. A carrier portion indicated generally by reference sign B, is formed therein in the following manner: A loop portion C, extending transversely of the belt is formed in the body of the belt. In the bight of this loop is inserted a rod D. The sides of the loop portion are brought together into contact with each other and are riveted together by rivets or bolts E. If desired, and where the carrying portion B is to perform the function merely of carrying cleats, I place a metal clip or sheathing indicated at F, over the loop and through the sides of which the rivets or bolts E, also pass and by which said clip or sheathing is securely clamped against the opposite sides of the folded or looped portion of the belt. In practice I prefer to turn the side edges G of the sheathing or clip in the direction of lead of the belt A and in contact with the surface of the belt. This prevents wear or chafing of the belt and efficiently braces and supports the belt at the fold thereof necessary to form the carrying portion. Of course it will be understood that similar cleats or carrying portions are formed at the desired distance apart through the length of the belt.

From the foregoing description it will be seen that I provide an exceedingly simple and efficient, strong and durable conveyer belt. It will also be seen that a carrying portion may be formed in the belt at the point where splices occur so as to conceal the splice within the sheathing or clip applied over the folded portion of the belt.

A carrier belt constructed as above described may be used for any purpose for which such devices are adapted.

In Fig. 3, I have shown my invention applied to belts carrying buckets or packets, H, such as are employed on vertically or vertically inclined carriers. In this arrangement the clip or sheathing which embraces and is riveted to the fold in the belt may be formed integrally with or otherwise connected to the bucket or packet H.

In Fig. 4, I have shown a tray or box form of receptacle J, the bottom of which is bent upwardly to form an embracing portion to engage over and to be riveted to the fold of the belt.

It is obvious that other forms of carrying buckets, pockets or the like may be adapted for use in connection with an endless or other form of conveyer constructed according to the principles of my invention.

What I claim as new and useful and of my own invention, and desire to secure by Letters Patent is,—

A conveyer belt having its body formed into a loop, a sheathing embracing said loop and rigidly secured thereto, one edge of said sheathing extending into the direction of lead of the belt, reinforcing the belt and formed into a carrier device.

In testimony whereof I have hereunto set my hand in the presence of the subscribing witnesses, on this 9th day of March A. D., 1914.

CARL T. WESTLIN.

Witnesses:
SAMUEL E. DARBY, Jr.,
CLINTON B. BROWN.

Copies of this patent may be obtained for five cents each, by addressing the "Commissioner of Patents, Washington, D. C."